United States Patent [19]

DuRocher et al.

[11] 4,034,265
[45] July 5, 1977

[54] ELECTRIC MOTOR PROTECTOR

[75] Inventors: Gideon A. DuRocher; Daniel J. DuRocher, both of Mount Clemens, Mich.

[73] Assignee: Essex International, Inc., Fort Wayne, Ind.

[22] Filed: Feb. 24, 1975

[21] Appl. No.: 552,171

Related U.S. Application Data

[63] Continuation-in-part of Ser. No. 371,247, June 18, 1973, abandoned.

[52] U.S. Cl. .................................. 361/25; 338/114; 337/349; 337/139; 361/24
[51] Int. Cl.² ..................... H02H 7/085; H02H 3/08
[58] Field of Search ................. 317/13 B, 13 C, 40, 317/41, ; 337/298, 317, 333, 342, 349, 359, 380, 140, 52, 388, 139; 338/99, 100, 114, 206

[56] References Cited

UNITED STATES PATENTS

| | | |
|---|---|---|
| 2,987,919 | 6/1961 | Kirby .......................... 337/349 X |
| 3,023,350 | 2/1962 | Broadley et al. ............ 317/13 C X |
| 3,613,732 | 10/1971 | Willson et al. ................ 337/140 X |
| 3,629,774 | 12/1971 | Crites .......................... 338/114 |
| 3,634,803 | 1/1972 | Willson et al. ................ 337/140 X |
| 3,648,002 | 3/1972 | DuRocher ..................... 338/114 X |

Primary Examiner—J D Miller
Assistant Examiner—Patrick R. Slace
Attorney, Agent, or Firm—Learman & McCulloch

[57] ABSTRACT

Apparatus for protecting the armature of an electric motor against excessive temperatures comprises a resiliently compressible and expansible pad in the armature circuit and composed of thermally sensitive, non-conductive material containing a plurality of conductive particles engageable with one another when the pad is in a compressed condition to establish a conductive path through the pad. The pad normally is maintained in a compressed, conductive condition by resilient force applying means which is of such resilience as to permit expansion of the pad in response to an increase in its temperature and render the pad non-conductive.

12 Claims, 8 Drawing Figures

ELECTRIC MOTOR PROTECTOR

RELATED APPLICATION

This application is a continuation-in-part of application Ser. No. 371,247, filed June 18, 1973 now abandoned.

The invention disclosed herein relates to apparatus for protecting a motor armature against damage caused by high temperatures resulting from excessive current values and more particularly to a protective device which inherently responds to temperature changes, either ambient or current-induced, to disconnect the armature from its source of electrical energy and thereby prevent damage to any part of the motor.

Apparatus constructed in accordance with the invention is particularly adapted for use in connection with a conventional permanent magnet motor having an armature winding mounted for rotation within a permanent magnet and having its leads connected to a commutator. Conductive brushes bear against the commutator and are mounted in brush holders that are connected to terminals which are adapted for connection to the positive and negative terminals of a battery or other source of electrical energy. Under normal operating conditions, closing of the circuit leading from the energy source to the motor terminals energizes the armature and effects rotation of the latter.

Energization of the armature of any permanent magnet motor is accompanied by a relatively high current surge of short duration which the component parts of the motor are capable of withstanding. Should the armature be locked so as to be incapable of rotating, however, the relatively high surge current can irreparably damage the armature. Should the armature commence rotating and subsequently become locked, the armature again may be subjected to abnormally high currents which, over a sustained period of time, may damage the armature.

Although there are many kinds of protective devices adapted for use in motors to prevent damage thereto due to abnormally high currents, such devices are relatively complex and expensive. Permanent magnet motors of the kind referred to are relatively inexpensive and highly competitive, thereby precluding the utilization of the conventional overload current protective devices.

An object of the present invention is to provide an inexpensive, thermally sensitive motor protection apparatus operable to prevent damage to the motor due to abnormal current values.

Another object of the invention is to provide motor protection apparatus of the character referred to and which is self-compensating for ambient temperature variations.

Other objects and advantages of the invention will be pointed out specifically or will become apparent from the following description when it is considered in conjunction with the appended claims and the accompanying drawing, in which:

Figure 1:
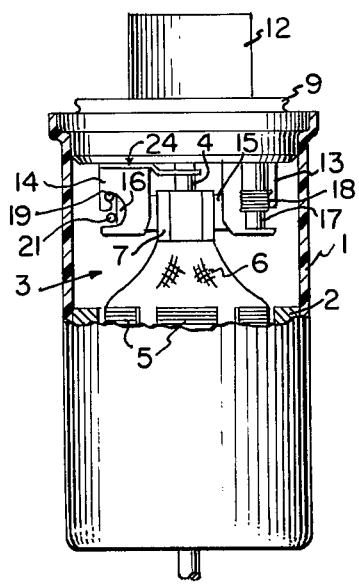
FIG. 1 is a side elevational view, partly broken away, of a conventional permanent magnet motor including protective apparatus constructed in accordance with one embodiment of the invention.
Figure 2:
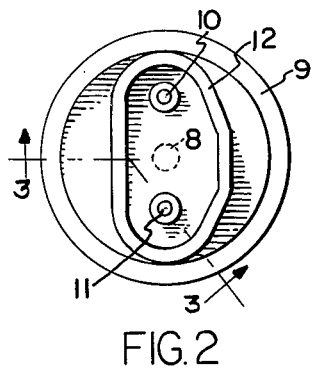
FIG. 2 is a top plan view of the motor.
Figure 3:
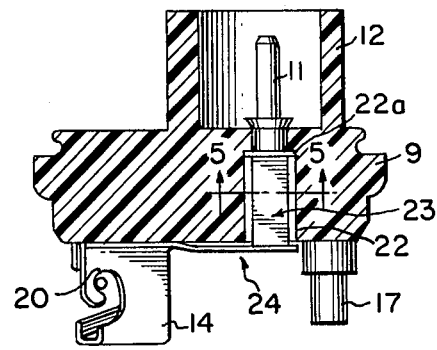
FIG. 3 is a sectional view, on an enlarged scale, taken on the line 3—3 of FIG. 2.
Figure 4:
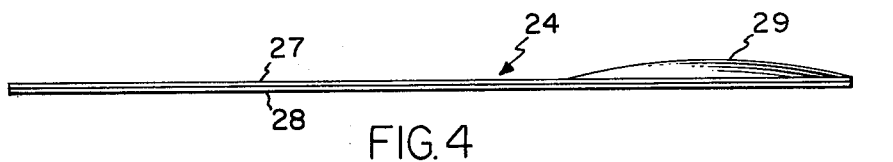
FIG. 4 is a side elevational view, on a greatly enlarged scale, of a component part of the protective apparatus.

A conventional permanent magnet electric motor is disclosed in FIG. 1 as comprising a cup-shaped housing or casing 1 open at one end and closed at the other and having an annular, permanent magnet 2 secured to its inner surface. Rotatably accommodated within the casing is a rotor or armature 3 comprising a shaft 4 on which are mounted pole pieces 5 and a winding 6, the opposite ends of which are connected to a segmented commutator 7, as is conventional. One end of the shaft 4 extends through an opening in the closed end of the casing 1 so as to be fitted with a gear (not shown) or the like and the opposite end of the shaft 4 is journaled in a socket 8 (FIG. 2) carried by a terminal block 9 that is secured to the open end of the casing 1.

The terminal block 9 is formed of insulating material and is fitted with a pair of externally accessible terminals 10 and 11 for connection to the terminals of a battery (not shown) or other source of electrical energy. The terminal 10 may be connected to the negative terminal of the battery. The terminal 11 is the feed terminal and may be connected to the positive terminal of the energy source. The terminals 10 and 11 are enclosed by a protective wall 12 that is adapted to accommodate a connector (not shown) fitted with conductors adapted for connection to the energy source.

The terminal 10 is riveted or otherwise secured to an electrically conductive brush holder 13 that is fixed to the inner surface of the terminal block 9, and the feed terminal 11 is connected in a manner subsequently to be described to an identical brush holder 14. Slidably accommodated in the brush holder 13 is a brush 15 and a similar brush 16 is accommodated in the holder 14. Adjacent each brush holder is a pin 17 which depends from the terminal block 9 and receives a jackspring coil 18. One leg 19 of each jackspring is accommodated in a notch 20 formed in the associated brush holder and the other arm 21 of each jackspring bears against the associated brush so as to urge the latter into engagement with the commutator 7.

The feed terminal 11 has a flange 22a forming the base of a recess 22 in the terminal block 9. Occupying the recess 22 and engaging the terminal 11 is a protective switching device or pad 23 which will be described in more detail hereinafter. The pad 23 is of such length as to project beyond the inner surface of the block 9 so as to engage the free end of an electrically conductive, resilient, force applying spring 24, the opposite end of which is secured to the brush holder 14. The members 7, 10, 11, 13, 14, 15, 16, 23, and 24 constitute conductive components for connecting the winding 6 to the energy source, and the member 23 is in constant engagement with the components 11 and 24.

The protective pad 23 corresponds to the pads disclosed in pending application Ser. No. 472,582, filed May 22, 1974, and to which reference may be had for a more detailed disclosure. Briefly, however, the pad comprises a body of resiliently compressible and expansible, non-conductive material such as silicone rubber having a relatively high coefficient of thermal expansion and contraction. The pad 23 contains a large quantity of electrically conductive particles 25 which are capable of movement relative to one another in response to compression and expansion of the pad so as to move into and out of engagement with one another. When the pad 23 is compressed, a sufficient number of the particles 25 move into engagement with one another to establish at least one train of engaged particles through the pad, thereby establishing at least one conductive path through the pad. The pad 23 preferably is molded under compression, in a known manner, so that the pad is electrically conductive without the application of an external compressive force. However, the pad can be molded in such manner as to be non-conductive in the absence of an externally applied force.

Each conductive particle 25 preferably comprises a sphere of base metal, such as copper, having a surface coating of noble metal, such as silver. Particles of such composite construction are less expensive than those formed completely of noble metal, but the electrical resistance of such composite particles corresponds substantially to the resistance of the nobel metal. The size of the particles may vary according to the current value they are designed to accommodate. That is, the lower the current, the smaller the particles, and vice versa. The size of the particles preferable is so selected that, although the particles are capable of accommodating current values up to a predetermined magnitude for a limited period of time, they are incapable of accommodating currents for a sustained period in excess of such predetermined magnitude. That is, when a current in excess of a predetermined value is imposed on the particles for more than a very short period of time, they decompose or are consumed by the heat generated by such current. Thus, the particles are capable of functioning in the same manner as a thermally sensitive fuse or circuit breaker.

The principles associated with particle size selection are substantially the same as the principles governing the selection of the size of a wire or other current conducting material. Further, the current conducting capacity of the particles may be determined empirically.

The exterior of the pad 23 preferably is coated on its sides and the marginal edges of its ends with a highly resistant, but conductive, material such a colloidal carbon, designated Electrodag 440 by its manufacturer. The purpose of the coating 26 will be explained hereinafter.

When the parts of the apparatus thus far described are assembled in the manner shown in FIG. 1, the motor may be conditioned for operation by connecting the terminals 10 and 11 via a switch (not shown) to the negative and positive terminals of the energy source, whereupon current will flow from the source to the feed terminal 11, through the pad 23, through the spring member 24 to the brush holder 14, and through the brush 16 to the commutator 7. Current will flow from the commutator through the winding 6, through the brush 15 to the brush holder 13, and thence through the terminal 10 to the energy source.

If the armature 3 is incapable or rotating when the winding 6 is connected to the energy source, the current supplied to the winding will generate a relatively high temperature in the pad 23. If the temperature is sufficiently high, the pad will expand and one or more of the engaged particles may be consumed or decomposed, thereby breaking the current path through the pad 23 and preventing damage to the armature winding. Consumption of a few particles will not prevent the pad from becoming conductive upon recompression, however, inasmuch as the pad contains so many particles that others may establish a conductive train. If the current-generated temperature is not sufficiently high to consume or decompose any of the conductive particles, but nevertheless is higher than can be withstood by the winding for a sustained period, the increased temperature will cause the pad 23 to expand, thereby effecting disengagement of some of the particles and breaking the current path through the pad. The armature winding thus will be protected against damage.

If the current-generated temperature is sufficient to consume one or more particles or effect expansion of the pad 23 and consequent breaking of the current path therethrough, the breaking of the current path will enable the pad to cool and contract. In either case the current path will be reestablished through the pad. The cycle then becomes repetitive. In many instances, the repetitive making and breaking of a circuit through the pad 23 is undesirable inasmuch as repetitive cycling rather quickly can drain a storage battery such as that used in an automobile, for example. Repetitive cycling can be prevented by means of the conductive coating 26 which preferably has a resistance such that it will pass current having a value of a few milliamperes. Such a small current is insufficient to damage the winding 6 or drain a conventional automotive storage battery, except after a passage of a long period of time, but such a current is capable of generating a temperature which will maintain the pad 23 in its expanded condition and prevent reestablishment of a current path through the pad.

It is well known that the winding of an electric motor is able to withstand, without damage, higher currents at colder ambient temperatures than it can withstand at higher ambient temperatures. For example, the winding 6 of the motor shown in FIG. 1 may be capable of withstanding a specified current without damage for a period of one minute at room temperature. At 200° F., however, the same winding will be capable of withstanding without damage the same current for only thirty seconds. On the other hand, at 40° F., the winding may be capable of withstanding without damage the same current for a period of two minutes.

The foregoing characteristics of an electric motor winding may be utilized to advantage by forming the force applying spring 24 as a bimetallic member having back-to-back strips 27 and 28 composed of different metals, each of which has different thermal coefficients of expansion. In the disclosed embodiment, the strip 27 has the higher coefficient and engages the pad 23. Thus, at relatively high ambient temperatures, the strip 27 will elongate to a greater degree than the strip 28 and move the free end of the member 24 in a direction away from the pad 23 to relieve the compressive force exerted on the latter, thereby enabling more rapid expansion of the pad 23 and interruption of the current path through the pad in a shorter period of time. Conversely, a lower ambient temperature will cause the strip 27 to contract to a greater degree than the strip 28, thereby moving the free end of the member 24 in a direction toward the pad 23 so as to increase the force applied to the pad and, consequently, increase the time required to interrupt the current path through the pad. In this manner, the motor protector apparatus is self-compensating for changes in ambient temperatures in keeping with the protective need of the motor winding.

The force initially applied by the member 24 on the pad 23 will vary according to the specific construction of the pad, taking into account such factors as the compressibility and length of the pad and the number and size of the particles in the pad. Preferably, the force applied to the pad by the member 24 will be that required to assure sufficient compression of the pad 23 at room temperature to render the pad normally conductive, but the force applied by the spring should not be so great that the pad is incapable of expanding due to an increase in its temperature and displacing the spring member 24 by an amount sufficient to enable the pad to be rendered non-conductive. The desired characteristics of the spring may be determined empirically taking into account the aforementioned characteristics of the pad itself.

That end of the member 24 which engages the pad 23 preferably is provided with a dimple 29 which is convex in the direction of the pad. This construction assures good electrical contact between the pad and the member 24 under conditions in which the ambient temperature is relatively cold.

Figure 5:
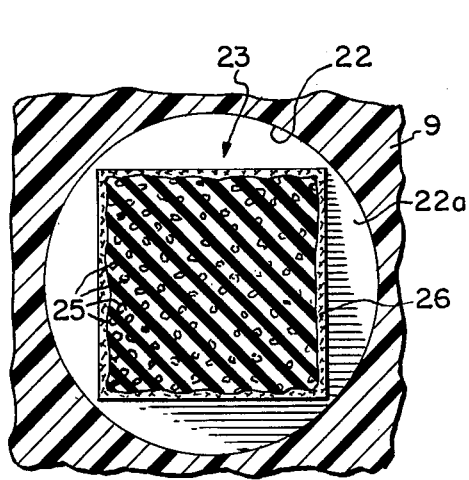
FIG. 5 is a cross-sectional view, on a greatly enlarged scale, and taken on the line 5—5 of FIG. 3.

As is best shown in FIG. 5, the cavity 22 is cylindrical, whereas the pad 23 is square in cross-section. The construction is preferred inasmuch as it facilitates assembly of the pad in the cavity while providing ample room for lateral expansion of the pad when the latter is compressed or when it expands in response to an increase in temperature.

Figure 6:
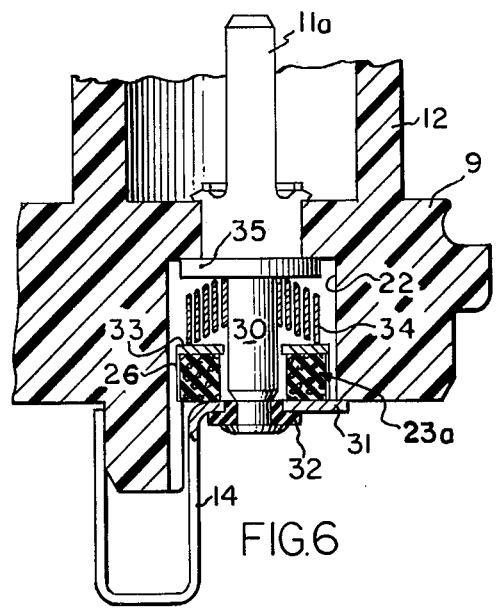
FIG. 6 is a view similar to FIG. 3, but illustrating a modified form of the invention.

The embodiment disclosed in FIG. 6 is similar in many respects to that described earlier, and similar parts are identified by the same reference character. In the FIG. 6 embodiment, the feed terminal 11a has an extension 30 which extends completely through the cavity 22 and is fastened to a leg 31 of the brush holder 14 by means of an insulating washer 32. A centrally apertured pad 23a surrounds the extension 30 and seats on the leg 31. The pad 23a has all the characteristics of the pad 23 and differs from the latter only in configuration. Atop the pad 23a is an electrically conductive washer 33 on which is seated an electrically conductive, convolute spring 34. The spring 34 has a conically convex side which bears against a shoulder 35 of the terminal 11a.

The spring 34 is adjusted at the time of its assembly with the associated apparatus to exert a predetermined force on the pad 23 such as to render the latter normally conductive or, if desired, the pad may be conductive irrespective of the application of force thereon by the spring 34. In either event, current may pass from the terminal 11a to the brush holder 14 via the shoulder 35, the spring 34, the washer 33, the pad 23a, and the leg 31. Should the pad 23a be subjected to a rise in temperature, the pad 23a will expand, collapsing the spring 34, whereupon the engaged particles in the pad will move apart so as to break the current path through the pad. When the temperature of the pad 23a falls, the spring 34 will expand axially so as to reestablish conductivity through the pad. Again, the force exerted on the pad 23a by the spring 34 should be so selected that the spring does not prevent expansion of the pad an amount sufficient to render it non-conductive.

Figure 7:
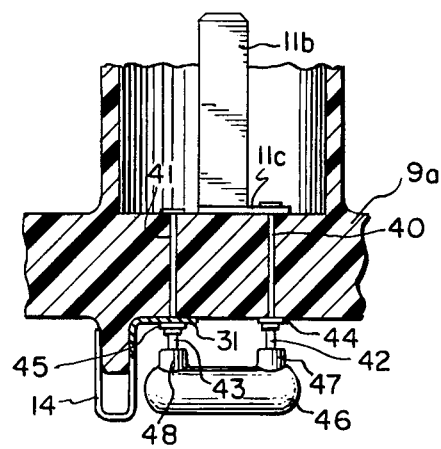
FIG. 7 is a view similar to FIG. 6, but illustrating a further embodiment of the invention.
Figure 8:
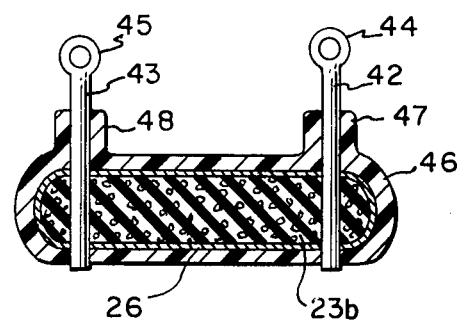
FIG. 8 is an enlarged, cross-sectional view of a portion of the apparatus shown in FIG. 7.

In the embodiment disclosed in FIGS. 7 and 8, the terminal block 9a is like the block 9 except that the block 9a has no recess 22. A feed terminal 11b has a foot 11c which seats on the block and is secured thereto by a rivet 40 which passes through the block. A second rivet 41, parallel to the rivet 40, extends through the block and is secured to the leg 31 of the brush holder 14.

The protective apparatus used in the embodiment of FIGS. 7 and 8 comprises a pad 23b having the same properties as the pad 23 and completely coated with the resistive coating 26. A pair of spaced apart, parallel, conductors 42 and 43 extend through the pad 23b and are provided at corresponding ends with terminals 44 and 45, respectively. Encapsulating the pad 23b and the coating 26 is an envelope 46 formed of an elastomeric, non-conductive, plastic material such as the polyester elastomer sold by E. I. DuPont under the trademark Hytrel. The envelope 46 has short legs 47 and 48 which encircle short portions of the respective conductors 42 and 43.

The pad 23b is molded in the same manner as has been described earlier in connection with the pad 23, except that the conductors 42 and 43 occupy the mold during the molding of the pad. The molded pad then is dipped in the coating 26 which is permitted to dry. The coated pad, together with the conductors 42 and 43, then is placed in an injection mold into which molten elastomer is injected to form the envelope 46. Following removal of the molded assembly from the injection mold the terminal 44 is fixed to the rivet 40 and the terminal 45 is fixed to the rivet 41 and to the leg 31 of the brush holder 14.

When the apparatus is assembled in the manner shown in FIG. 7, the envelope 46 exerts sufficient compressive force on the pad 23b to render the latter conductive whereby current may flow from the terminal 11b to the brush holder 14 via the conductor 42 and that portion of the pad 23b between the conductors 42 and 43 to the latter and thence to the brush holder. Should the temperature of the pad 23b rise, the pad may expand, as is permitted by the elasticity of the envelope 46, so as to render the pad non-conductive. The inherent resiliency of the material of the envelope 46, however, subjects the pad to a compressive force sufficient to restore the pad to a state of conductivity when the temperature of the pad falls. The coating 26 functions in the same manner as has been described earlier.

The material forming the envelope 46 preferably is thermally sensitive so as to expand and contract in response to an increase and decrease, respectively, in ambient temperature, thereby enabling automatic compensation for temperature variations in the same manner described in connection with the spring 24. An advantage of the embodiment shown in FIGS. 7 and 8 is that current need not pass through a spring member.

The disclosed embodiments are representative of the presently preferred forms of the invention, but are intended to be ilustrative rather than definitive thereof. The invention is defined in the claims.

We claim:

1. Apparatus for protecting an electric motor having a winding and electrically conductive components for connecting said winding in an electrical circuit, said apparatus comprising a compressible and expansible device constituting one of said components and constantly in bridging engagement with others of said components, said device comprising a plurality of electrically conductive particles contained in a thermally sensitive, elastomeric, non-conductive material which is expansible and contractile in response to an increase and decrease, respectively, in its temperature; and resilient, thermally sensitive force applying means acting on said device and normally applying on the latter a compressive force of such magnitude as to effect engagement of said conductive particles with one another and establish a conductive path through said material, the force applied by said force applying means on said device varying inversely with the temperature of said force applying means, said force applying means being of such resilience as to yield in response to expansion of said material due to an increase in its temperature and in an amount sufficient to enable disengagement of said conductive particles and thereby break the conducitve path through said material.

2. Apparatus according to claim 1 wherein said force applying means comprises a spring.

3. Apparatus according to claim 2 wherein said spring comprises a bi-metallic member.

4. Apparatus according to claim 1 wherein said device has a highly resistive, electrically conductive coating thereon.

5. Apparatus according to claim 1 wherein the size and resistance of said particles are so selected that said particles are capable of conducting a current of predetermined magnitude sufficient to enable normal operation of said motor but are consumable by a current in excess of such predetermined magnitude.

6. Apparatus according to claim 5 wherein the quantity of said particles is such that compression of said pad following consumption of one or more of said particles enables others of said particles to reestablish a conductive path through said pad.

7. Apparatus according to claim 1 wherein said device is normally conductive in the absence of externally applied compressive force.

8. Apparatus according to claim 1 wherein said force applying means comprises an envelope encapsulating said device.

9. Apparatus according to claim 8 including a resistive coating interposed between said pad and said envelope.

10. Apparatus according to claim 8 wherein said envelope is composed of a thermally expansible and contractile elastomer.

11. Apparatus according to claim 8 including a pair of spaced apart conductors embedded in said pad and projecting through said envelope.

12. Apparatus for protecting an electric motor having a winding and electrically conductive components for connecting said winding in an electrical circuit, said apparatus comprising a compressible and expansible device consituting one of said components, said device comprising a plurality of electrically conductive particles contained in a thermally sensitive, elastomeric, non-conductive material which is expansible and contractile in response to an increase and decrease, respectively, in its temperature; and resilient force applying means acting on said device and normally applying on the latter a compressive force of such magnitude as to effect engagement with one another of a sufficient number of said conductive particles to render said device conductive, said force applying means being responsive to increases and decreases in current induced and ambient temperatures to decrease and increase, respectively, the force applied by said force applying means on said device, and said force applying means being of such resilience as to yield in response to expansion of said material due to an increase in the temperature of the latter and in an amount sufficient to enable disengagement of said conductive particles and thereby render said device nonconductive.

* * * * *